United States Patent
Lee et al.

(10) Patent No.: US 7,072,030 B2
(45) Date of Patent: Jul. 4, 2006

(54) OPTICAL SHEET AND OPTIMIZING METHOD THEREOF

(75) Inventors: Don Gyou Lee, Gyeongsangbuk-do (KR); Ki Yon Song, Gyeonggi-Do (KR); Soon Ho Lee, Gyeongsangnam-do (KR); Jang Ryang Kim, Busan-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 435 days.

(21) Appl. No.: 10/694,958

(22) Filed: Oct. 29, 2003

(65) Prior Publication Data

US 2004/0125362 A1    Jul. 1, 2004

(30) Foreign Application Priority Data

Dec. 31, 2002    (KR) .................. 10-2002-0088363

(51) Int. Cl.
*G01J 1/00* (2006.01)
(52) U.S. Cl. .................. 356/122; 362/31; 359/599; 349/64; 349/112; 428/480
(58) Field of Classification Search .................. 356/122, 356/239.1–239.4; 362/31, 551, 26; 349/112, 349/64; 359/599, 452, 453, 355; 428/1.3, 428/480
See application file for complete search history.

(56) References Cited

U.S. PATENT DOCUMENTS

| | | | | |
|---|---|---|---|---|
| 5,706,134 | A | * | 1/1998 | Konno et al. ............... 359/599 |
| 6,771,335 | B1 | * | 8/2004 | Kimura et al. .............. 349/112 |
| 2003/0123151 | A1 | * | 7/2003 | Matsunaga et al. ......... 359/599 |
| 2005/0088839 | A1 | * | 4/2005 | Huang et al. ................. 362/31 |

* cited by examiner

*Primary Examiner*—Hoa Q. Pham
(74) *Attorney, Agent, or Firm*—Morgan, Lewis & Bockius, LLP (57) ABSTRACT

An optical sheet optimization method includes the steps of: extracting a statistic sample using transmissivity, haze data and luminance data of an optical diffusion sheet corresponding to the transmissivity and the haze data; making a regression model for the extracted statistic sample; calculating a regression coefficient to minimize an error term (residual) of the regression model and deriving a regression expression using the calculated regression coefficient; and predicting a luminance of the optical diffusion sheet due to changes of the transmissivity and the haze data using the derived regression expression.

15 Claims, 6 Drawing Sheets

OPTICAL SHEET AND OPTIMIZING METHOD THEREOF

This application claims the benefit of Korean Application No. 2002-88363 filed in Korea on Dec. 31, 2002, which is hereby incorporated by reference.

BACKGROUND OF THE INVENTION

1. Field of the Invention

The present invention relates to an optical sheet and optimizing method thereof, and more particularly, to an optical sheet and optimizing method thereof capable of maintaining contrast throughout a wide viewing angle.

2. Description of the Related Art

Generally, a cathode ray tube (CRT) has been most widely used as an image display devices for displaying images on a screen. However, the CRT is inconvenient since it is large and heavy for the amount of display area provided. Thus, a CRT can only be used in places where both the size and weight of the CRT can be accommodated.

A flat panel display has a large display area while being both thin and light. Thus, a flat panel display can be installed in more places than a CRT. Accordingly, flat panel displays are replacing CRTs. Liquid Crystal Display (LCDs) are especially replacing CRTs since LCDs have excellent resolution compared with other flat panel displays and a response speed that is as fast as the CRT in displaying a moving picture.

The operating principle of the LCD is based on the optical anisotropy and polarization property of liquid crystal molecules. Since a liquid crystal molecule is a thin and long structure, it is possible to control the alignment direction of a string of liquid crystal molecules by applying an electric field across them. Hence, if the alignment direction is controlled, light can be transmitted or blocked according to the alignment direction of liquid crystal molecules due to the optical anisotropy of the liquid crystal molecules, and colors and images can be displayed using color filters.

In an active matrix LCD, an active element is included with each of the pixels arranged in a matrix configuration. Each pixel is controlled using the switching characteristic of this active element. The active matrix LCD is an apparatus that realizes a memory function using electro-optic effects of liquid crystal. However, the active matrix liquid crystal display has a drawback in that its contrast ratio changes depending on the viewing angle.

To resolve the problem of a changing contrast ratio as the viewing angle changes, various methods have been suggested. For example, multidomain technology has been suggested, in which one pixel is divided into several regions (i.e., multidomains) and the alignment of liquid crystal molecules is different depending on the domains. This allow the characteristic of the pixel to be an average of characteristics realized by the domains of one pixel. In another method, phase compensation technology has been suggested in which a phase difference film reduces a phase difference change depending on the viewing angle. Further, In Plane Switching (IPS) mode also has been suggested in which a lateral electric field is applied to the liquid crystal and the liquid crystal direction is twisted on the plane parallel with the alignment film. Furthermore, a vertical alignment mode has been suggested in which liquid crystal with a vertical alignment film and a negative dielectric anisotropy is used. As described above, the solutions to solve the viewing angle problems have been addressed by changing liquid crystal modes used in LCDs.

Generally, the LCD is a passive display device that does not have its own light source. Accordingly, an LCD needs a backlight assembly including a lamp, a light guide and a few sheets, such as polarizer and a diffuser, for a light source. The backlight assembly plays an important role in the display performance of an LCD.

Figure 1:
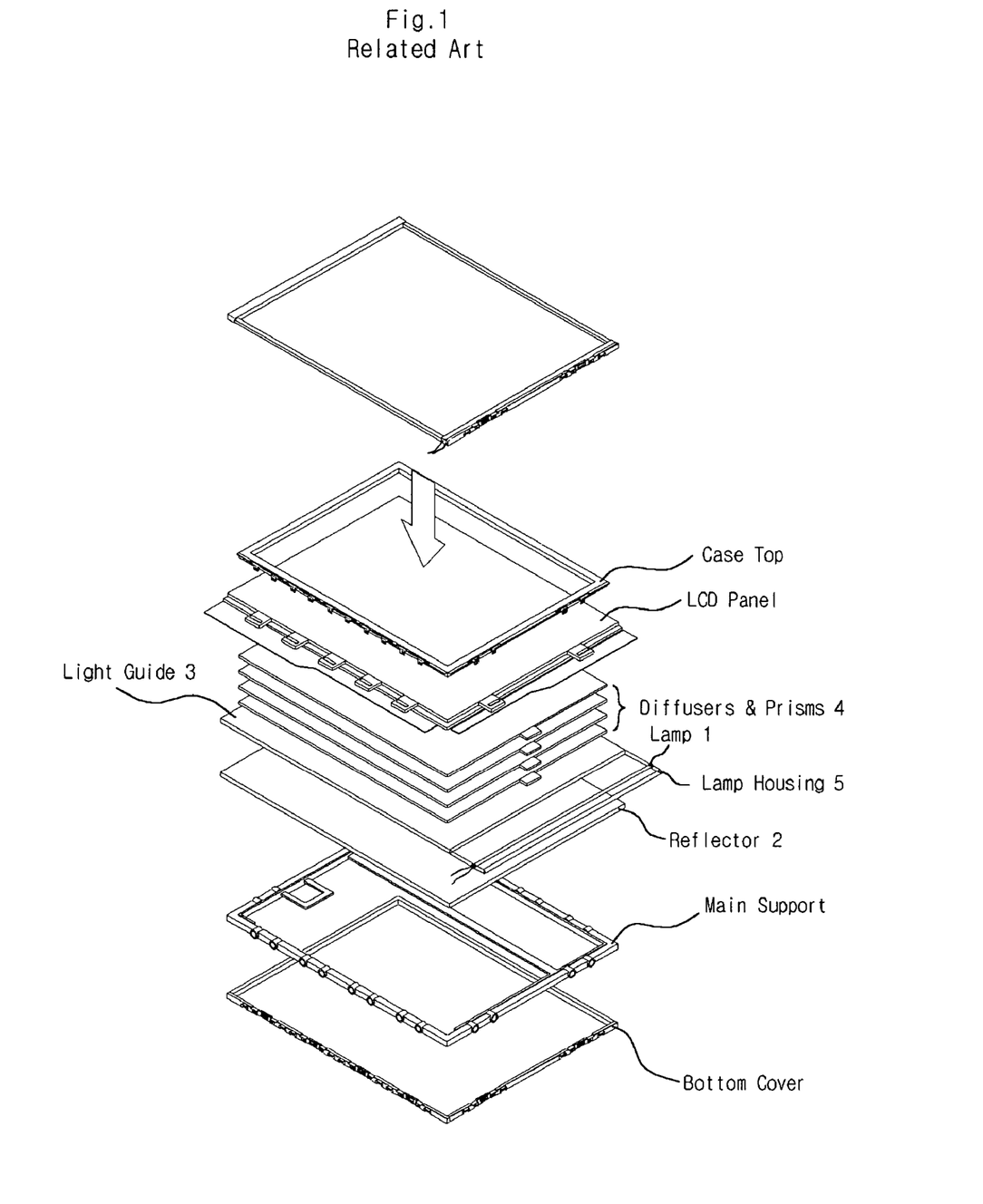
FIG. 1 is an exploded perspective view of a related art LCD module.

FIG. 1 is an exploded perspective view of a related art LCD module. As shown in FIG. 1, the backlight assembly includes a lamp 1 for emitting light, a reflector 2 for reflecting the emitted light upwards and a light guide 3 for propagating the light emitted from the lamp 1. The backlight assembly further includes diffusers and prisms 4 for diffusing the light that is transmitted upwards and for enhancing light efficiency of the LCD. The backlight assembly is further provided with a lamp housing 5 for reflecting the light emitted from the lamp toward the light guide and for supporting the lamp.

Figure 2:
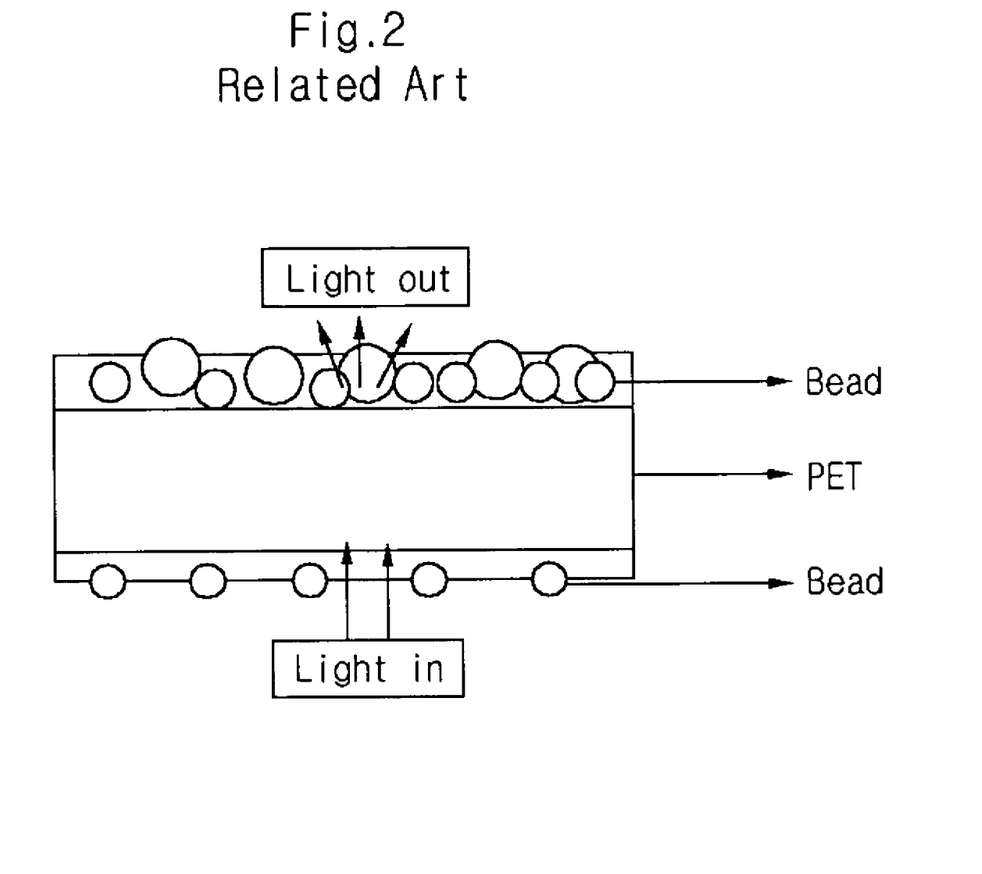
FIG. 2 is a cross sectional view of an optical diffusion sheet employed in a related art backlight assembly.

FIG. 2 is a cross sectional view of an optical diffusion sheet employed in a related art backlight assembly. As shown in FIG. 2, the optical diffusion sheet consists of a plurality of layers. More particularly, the optical diffusion sheet is fabricated to enhance the transmissivity of light and to diffuse the light by changing the materials of the films constituting each layer and controlling both an interval and arrangement of beads.

In the related art, correction of the viewing angle problem is attempted mainly by changing the liquid crystal mode and configuring the light diffusion sheet such that transmissivity and luminance are concentrated at the central point of the LCD panel. Thus, the improving transmissivity and display quality through a thickness control of the optical diffusion sheet is a main issue. Further, because it is thought that only the transmissivity of the optical diffusion sheet determines the luminance in the final LCD module state, a lot of research has occurred to enhance the transmissivity of the optical diffusion sheet. Much research also has occurred to enhance the haze of the optical diffusion sheet to correct the viewing angle problem.

Figure 3:
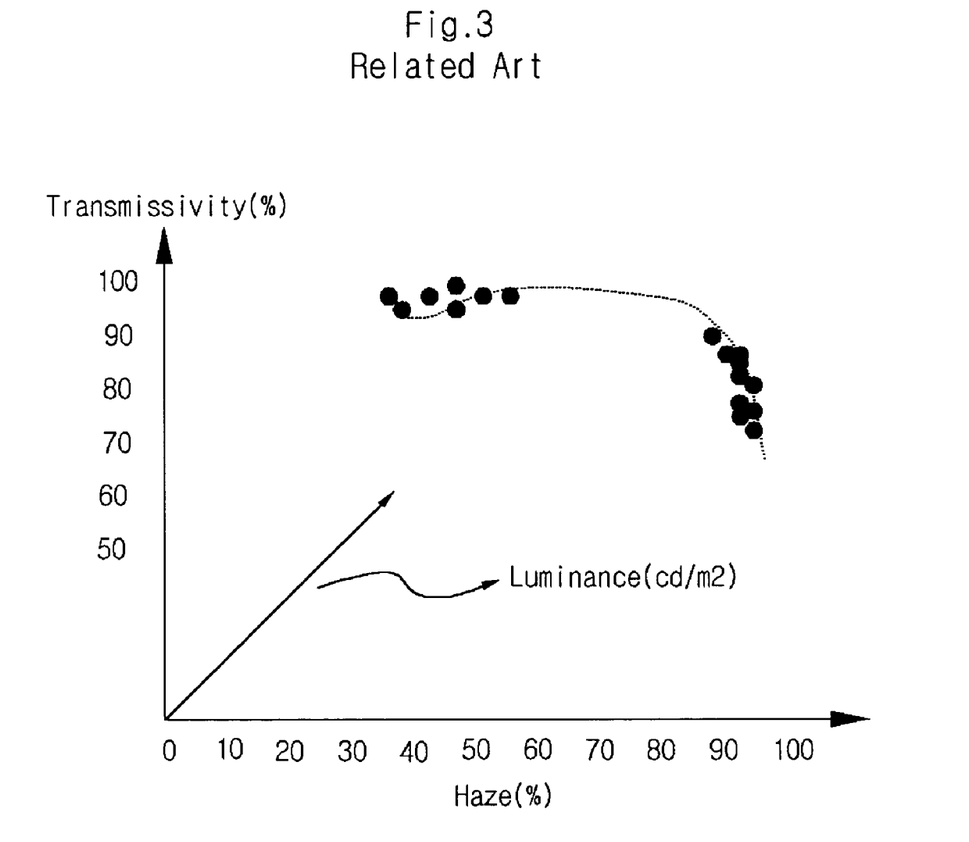
FIG. 3 illustrates haze and transmissivity characteristics of a plurality of related art optical diffusion sheets represented as dots on a graph.

FIG. 3 illustrates haze and transmissivity characteristics of a plurality of related art optical diffusion sheets represented as dots on a graph. As shown in FIG. 3, optical diffusion sheets are one of two groups. In other words, an optical diffusion sheet is either a high haze sheet or a high transmissivity sheet. Thus, grouping a high haze sheet together with a high transmissivity can have the effect of reducing the overall luminance.

SUMMARY OF THE INVENTION

Accordingly, the present invention is directed to an optical sheet and optimizing method thereof that substantially obviates one or more problems due to limitations and disadvantages of the related art.

An object of the present invention is to provide an optical sheet and optimizing method thereof capable of maintaining contrast throughout a wide viewing angle.

Another object is to improve the viewing angle by analyzing the correlation of haze and transmissivity for a plurality of optical diffusion sheets on luminance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical sheet optimization method includes the steps of: extracting a statistic sample using transmissivity, haze data and luminance data of an optical diffusion sheet corresponding to the transmissivity and the haze data; making a regression model for the extracted statistic sample; calculating a regression coefficient to minimize an error term (residual) of the regression model and deriving a regression expression using the calculated regression coefficient; and predicting luminance of the optical diffusion sheet due to changes of the transmissivity and the haze data using the derived regression expression.

In another aspect of the present invention, an optical sheet is manufactured to be suitable for transmissivity and haze selected as optical sheet conditions using a result predicted through an optical sheet optimization method comprising the steps of: extracting a statistic sample using transmissivity, haze data and luminance data of an optical diffusion sheet corresponding to the transmissivity and the haze data; making a regression model for the extracted statistic sample; calculating regression coefficient to minimize an error term (residual) of the regression model and deriving a regression expression using the calculated regression coefficient; and predicting luminance of the optical diffusion sheet due to changes of the transmissivity and the haze data using the derived regression expression.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Reference will now be made in detail to the preferred embodiments of the present invention, examples of which are illustrated in the accompanying drawings.

The present invention is directed to a method for improving the viewing angle of an LCD and/or maintaining contrast throughout a wide viewing angle without changing the liquid crystal mode employed in the liquid crystal display. In this method, a correlation between the transmissivity and the haze of the optical diffusion sheet provided in the backlight assembly that supplies light so as to display images is analyzed. In general, when discussing the viewing angle of an LCD, the contrast ratio (CR) and luminance viewing angle are examined. Here, the correlation between the transmissivity and the haze of the optical diffusion sheet affecting the luminance viewing angle is analyzed.

In the present invention, to obtain the optimal design condition of the optical diffusion sheet, transmissivity and haze of various conventional optical diffusion sheets and luminance data of the optical diffusion sheet corresponding to the data are utilized. Also, in the present invention, regression analysis method and correlation analysis method that analyze the correlation between variables are utilized on the basis of the statistic samples obtained based on the data. Regression analysis and correlation analysis methods are used when analyzing the relation between variables based on the statistics obtained from samples. More specifically, regression analysis is used to represent a mathematical relation between a result value, variables and relation between variables. On the other hand, the correlation analysis is a simple value (not a mathematical expression) that represents a relation between two variables.

When the mathematical functional relation between some variables is known, it is possible to estimate the result only by a few variables using the expression. A regression analysis finds mathematical relation between variables. There are two kinds of regression analysis. One is a simple regression analysis that has one independent variable and one dependent variable. The other kind is a multi-regression analysis in which the relation between a plurality of independent variables and one dependent variable is analyzed.

In a regression model, there is a definite model that has a one-to-one relation between an independent variable and a dependent variable, and a stochastic model in which a dependent variable is determined stochastically. In general, the stochastic model can be represented by adding the stochastic part to the definite part. On the other hand, in a regression model, most statistics have a stochastic model. The stochastic model does not have precise value and has some errors. These errors are generated due to the following:

1) Accidental error: Never predictable. Strictly speaking, there are no two things the same in the world. In other words, some deviation is inevitable and will be made.

2) Measurement error: Measurement is essential for statistical processes but error is necessarily generated in measuring values. Absolute measurement is impossible no matter how precise a measuring instrument is.

3) Functional error: This error is generated when the relation between an independent variable and a dependent variable is erroneously set.

Considering these points, regression model analysis tries to make an assumption on an error term in this stochastic model and to find an average relation between a dependent variable and an independent variable To complete a regression expression, regression coefficients should be found. However, since it is not possible to find these coefficients for an entire parent group, these coefficients should be estimated. Here, a regression model of a sample can be expressed as follows and the error of the sample is called 'residual' and expressed as $e_i$. The description will be made based on a simple regression model for convenience.

Regression model of a sample: expression for representing actual measurement $$Y_i = a + bX_i + e_i$$

Regression expression of a sample: expression for calculating estimation $$Y_i' = a + bX_i$$

Hence, the residue $e_i$ can be obtained as follows:

$$e_i = Y_i - Y_i'.$$

Here, since a regression coefficient of a sample is used as estimation of the regression coefficient of a parent group, the error of the regression expression of the parent group is large as the residue is large. In addition, the regression model is an expression for representing the method of expressing each measurement and includes an error term. The regression expression represents a relationship between an independent variable and a dependent variable and does not include the error term.

There can be a few regression expressions as that regression expression. The regression line that can best represent the relation between a dependent variable and an independent variable would be the line on which the sum of residues is least. From this, the regression line to minimize the residue is selected.

Additionally, the positive residue and the negative residue cancel each other such that each residue size will not influence a total residue. Accordingly, the method in which the line to minimize sum of squares of residues is obtained is used. This method is called minimum square method.

$$\min \Sigma e_i^2 = \min \Sigma (Y_i - Y_i')^2$$

Substituting $Y_i' = a + bX_i$ in the above expression, $$\min \Sigma e_i^2 = \min \Sigma (Y_i - a - bX_i)^2$$

To complete the above regression, the constant a and b to meet the above expression should be obtained. Here, to obtain a and b, the above expression should be partially differentiated with respect to a and b. Moreover, a and b can be obtained by reforming the partial differentiated expression.

A process to derive the optical diffusion sheet optimization method according to the present invention using the regression analysis method and correlation analysis method will now be made. To obtain optimum design conditions of an optical diffusion sheet, a sample is extracted using transmissivity and haze data of various conventional optical diffusion sheets and luminance data of the optical diffusion sheet corresponding to the transmissivity and haze data. In embodiments of the present invention, a regression model is made using the extracted sample. Considering that the difference between actual value and estimation is large when a simple regression model is made for luminance data based on transmissivity and haze data of the optical diffusion sheet, the following multi regression model is made for precise analysis.

$$L = a + bT + cH + dT^2 + eH^2 + fTH + e_i$$

where L is luminance,

T is transmissivity,

H is Haze, a, b, c, d, e, and f are regression coefficients for each item, and $e_i$ is an error term (residual).

From this regression model, the regression coefficients a, b, c, d, e, and f to minimize error terms will be found so as to optimize desired estimation expression. As described above, the expression to find regression coefficients is simplified using minimum square method as follows.

$$\sum_{i=1}^{n} e_i^2 = \sum_{i=1}^{n} (L_i - a - bT - cH - dT^2 - eH^2 - fTH)^2$$

In the above expression, to obtain the values of a, b, c, d, e and f to minimize square of the error term, the expression is partially differentiated with respect to a, b, c, d, e and f. The partially differentiated expression is set to zero and simplified so that the values of a, b, c, d, e and f can be obtained. To find the constants a, b, c, d, e and f, luminance is measured according to each optical diffusion sheet to make a statistics table. More specifically, the transmissivity and the haze of the optical diffusion sheet used in measurement are measured and the constants a, b, c, d, e and f are calculated using the measured data.

The regression coefficients calculated through the process described above are as follows.

a=−829.835
b=36.6164
c=−6.76063
d=−0.277104
e=−0.0249331
f=0.101428

The regression expression is completed as follows using these regression coefficients.

$$L = -829.835 + 36.6164 \times T - 6.76063 \times H - 0.277104 \times T^2 - 0.0249331 \times H^2 + 0.101428 \times H \times T$$

Figure 4:
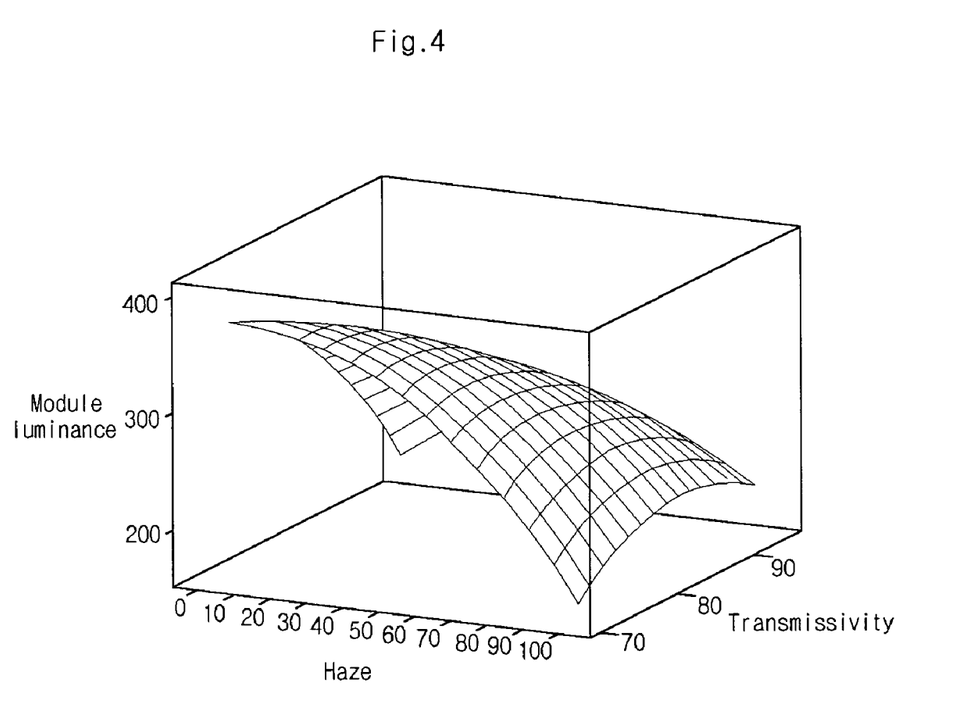
FIG. 4 illustrates a three-dimensional relation of module luminance, transmissivity and haze of an optical diffusion sheet derived by an optical sheet optimization method according to the present invention.

Similarly, the regression coefficients a, b, c, d, e and f are calculated so that the regression expression for luminance based on transmissivity and haze data of each optical diffusion sheet will be derived. Accordingly, the influence that the changes of transmissivity and haze of the optical diffusion sheet affect luminance based on this can be analyzed. By this multi regression analysis, surface plot of module luminance can be obtained in three-dimensional space as shown in FIG. 4. FIG. 4 illustrates the three dimensional relation of module luminance, transmissivity and haze of an optical diffusion sheet derived by an optical sheet optimization method according to the present invention.

Figure 5:
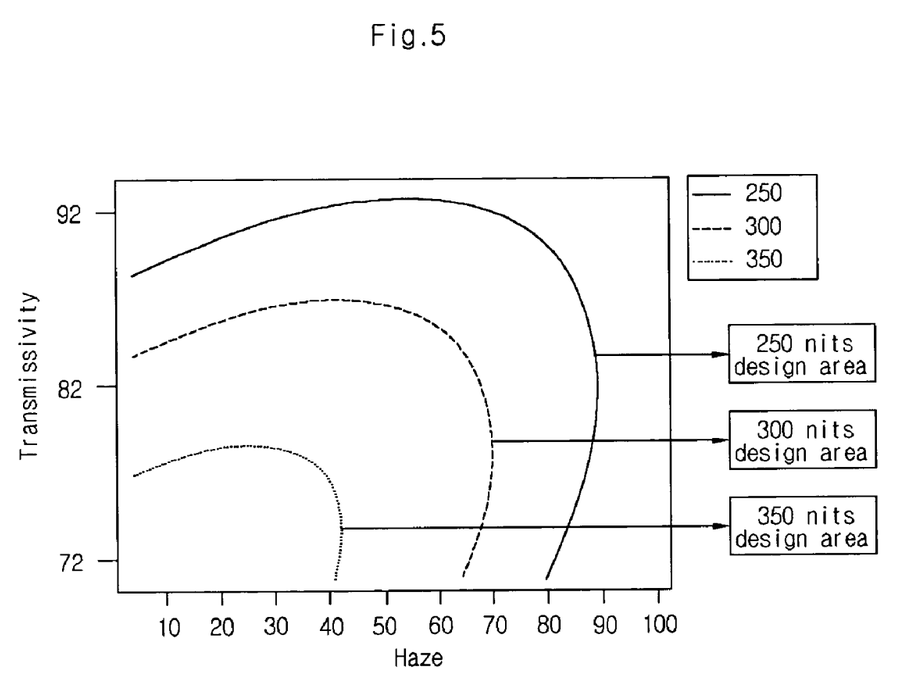
FIG. 5 illustrates aa two-dimensional relation between transmissivity and haze for specific module luminance in optical diffusion sheet conditions derived by an optical sheet optimization method according to the present invention.

As shown in FIG. 5, contour plot of module luminance in two-dimensional space for transmissivity and haze to meet a predetermined luminance area (250 nits design area, 300 nits design area, 350 nits design area) is obtained. FIG. 5 illustrates the relation between transmissivity and haze for specific module luminance in optical diffusion sheet conditions derived by an optical sheet optimization method according to the present invention in two-dimension.

As shown in FIGS. 4 and 5, according to the result obtained in the present invention, differences between characteristics of the conventional optical diffusing sheets can be found. On the other hand, as described above referring to FIG. 3, the conventional optical diffusion sheets were divided into a group of high transmissivity and a group of high haze. Here, the luminance of the related art optical diffusion sheets is about 200–220 nits.

Referring to FIGS. 4 and 5, it can be recognized that there is condition area of the optical diffusion sheet having luminance of 250–350 nits exceeding the luminance area of the conventional optical diffusion sheet. In addition, it can be recognized that the transmissivity and the haze of the optical diffusion sheet having high luminance of 250–350 nits do not belong to the conventional polarized group any one of the transmissivity and the haze of which approaches 100%. Both transmissivity and haze are all medium value.

Figure 6:
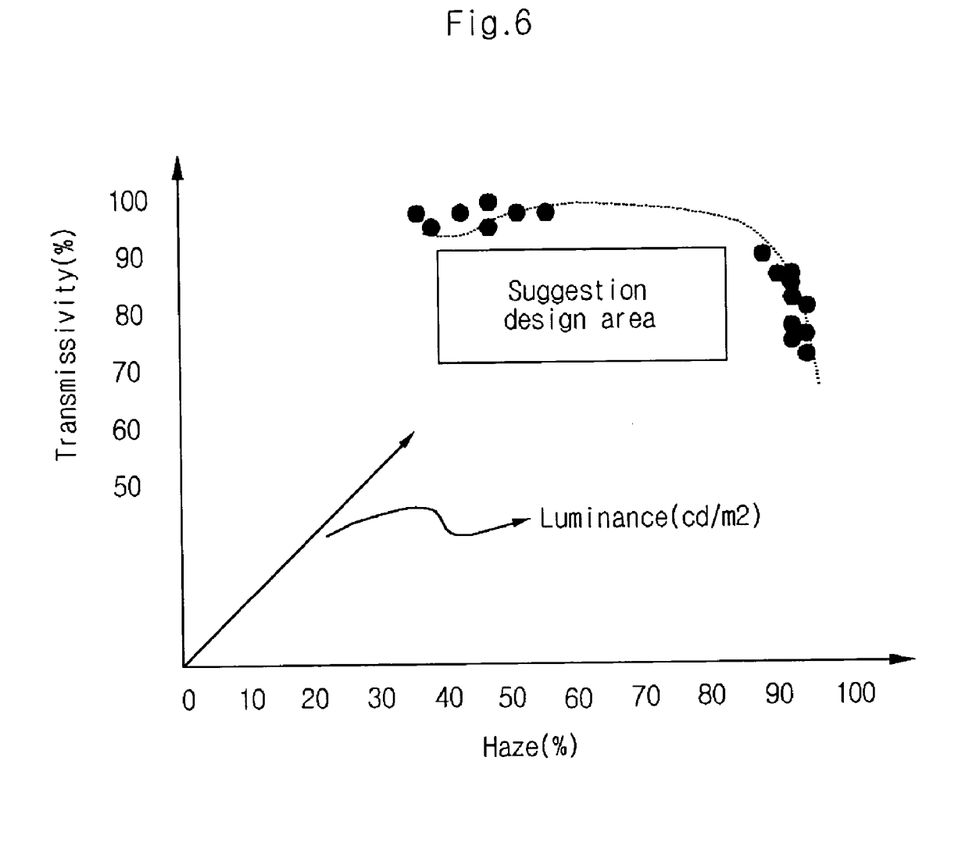
FIG. 6 illustrates a high luminance design area of an optical diffusion sheet determined by an optical sheet optimization method according to the present invention.

In other words, the optical diffusion has high luminance when the haze of the optical diffusion sheet is 40–85% and the transmissivity of it is 77–92%. This result is illustrated in FIG. 6. FIG. 6 illustrates a high luminance design area of an optical diffusion sheet suggested by an optical sheet optimization method according to the present invention. Described again, even though the optical diffusion sheet has low haze and low transmissivity compared with the conventional optical diffusion sheet, the optical diffusion sheet with higher luminance can be obtained as a result.

Transmissivity and haze of the optical diffusion sheet having characteristics described above can be calculated through the regression expression derived as above. The condition region for transmissivity and haze that satisfies high luminance from FIG. 6 will be described as follows.

1) Area of luminance of 350 nits: area in which haze is 40–42% and transmissivity is 72–77%, area in which haze is 10–40% and transmissivity is 77–80%
2) Area of luminance of 300 nits: area in which haze is 60–70% and transmissivity is 72–85%, area in which haze is 10–70% and transmissivity is 84–87%
3) Area of luminance of 250 nits: area in which haze is 80–85% and transmissivity is 72–92%, area in which haze is 10–85% and transmissivity is 88–92%

As described above, according to the optical sheet and the optimization method of the present invention, the viewing angle of an image device is improved, through optimum design of optical diffusion sheet provided in a backlight assembly supplying light to an image display device. Additionally, conditions of the optical sheet satisfying desired characteristics are set deliberately according to the optical sheet and the optimization method thereof in the present invention so that time and cost required for design/manufacturing process of optical sheet are saved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical sheet optimization method comprising the steps of:
   extracting a statistic sample using transmissivity, haze data and luminance data of an optical diffusion sheet corresponding to the transmissivity and the haze data;
   making a regression model for the extracted statistic sample;
   calculating a regression coefficient to minimize an error term (residual) of the regression model and deriving a regression expression using the calculated regression coefficient; and
   predicting a luminance of the optical diffusion sheet due to changes of the transmissivity and the haze data using the derived regression expression.

2. The method according to claim 1, wherein the regression model is made into a multi regression model for the transmissivity and haze data.

3. The method according to claim 1, wherein the regression model is made into an expression as follows:

$$L=a+bT+cH+dT^2+eH^2+fTH+e_i$$

where L is luminance,
T is transmissivity,
H is Haze,
a, b, c, d, e, and f are regression coefficients for each item, and
$e_i$ is an error term (residual).

4. The method according to claim 1, wherein the regression expression is derived by an expression as follows:

$$L=a+bT+cH+dT^2+eH^2+fTH$$

where L is luminance,
T is transmissivity,
H is Haze, and
a, b, c, d, e, and f are regression coefficients for each item.

5. The method according to claim 1, wherein in calculating the regression coefficient to minimize the error term (residual) of the regression model, the regression coefficient is calculated using a minimum square method.

6. An optical sheet manufactured to be suitable for transmissivity and haze selected as optical sheet conditions using a result predicted through an optical sheet optimization method comprising the steps of:
   extracting a statistic sample using transmissivity, haze data and luminance data of an optical diffusion sheet corresponding to the transmissivity and the haze data;
   making a regression model for the extracted statistic sample;
   calculating regression coefficient to minimize an error term (residual) of the regression model and deriving a regression expression using the calculated regression coefficient; and
   predicting a luminance of the optical diffusion sheet due to changes of the transmissivity and the haze data using the derived regression expression.

7. The optical sheet according to claim 6, wherein the selected optical sheet conditions has transmissivity of 77–92% and haze of 40–85%.

8. The optical sheet according to claim 6, wherein the selected optical sheet conditions has transmissivity of 72–77% and haze of 40–42%.

9. The optical sheet according to claim 6, wherein the selected optical sheet conditions has transmissivity of 77–80% and haze of 10–40%.

10. The optical sheet according to claim 6, wherein the selected optical sheet conditions has transmissivity of 72–85% and haze of 60–70%.

11. The optical sheet according to claim 6, wherein the selected optical sheet conditions has transmissivity of 84–87% and haze of 10–70%.

12. The optical sheet according to claim 6, wherein the selected optical sheet conditions has transmissivity of 72–92% and haze of 80–85%.

13. The optical sheet according to claim 6, wherein the selected optical sheet conditions has transmissivity of 88–92% and haze of 10–85%.

14. An image display device comprising an optical sheet manufactured to be suitable for transmissivity and haze selected as optical sheet conditions using a result predicted through an optical sheet optimization method comprising the steps of:

extracting a statistic sample using transmissivity, haze data and luminance data of an optical diffusion sheet corresponding to the transmissivity and the haze data;

making a regression model for the extracted statistic sample;

calculating regression coefficient to minimize an error term (residual) of the regression model and deriving a regression expression using the calculated regression coefficient; and predicting a luminance of the optical diffusion sheet due to changes of the transmissivity and the haze data using the derived regression expression.

15. The image display device according to claim 14, wherein the selected optical sheet conditions has transmissivity of 77–92% and haze of 40–85%.

* * * * *